United States Patent
Frederick

(10) Patent No.: US 11,487,651 B2
(45) Date of Patent: Nov. 1, 2022

(54) SYSTEMS AND METHODS FOR QUANTIFYING THE EFFECTIVENESS OF SOFTWARE AT DISPLAYING A DIGITAL RECORD

(71) Applicant: FUJIFILM MEDICAL SYSTEMS U.S.A., INC., Morrisville, NC (US)

(72) Inventor: Logan Frederick, Morrisville, NC (US)

(73) Assignee: FUJIFILM MEDICAL SYSTEMS U.S.A., INC., Morrisville, NC (US)

( * ) Notice: Subject to any disclaimer, the term of this patent is extended or adjusted under 35 U.S.C. 154(b) by 0 days.

(21) Appl. No.: 16/921,319

(22) Filed: Jul. 6, 2020

(65) Prior Publication Data
US 2022/0004486 A1 Jan. 6, 2022

(51) Int. Cl.
*G06F 11/36* (2006.01)

(52) U.S. Cl.
CPC ...... *G06F 11/3692* (2013.01); *G06F 11/3664* (2013.01); *G06F 11/3688* (2013.01)

(58) Field of Classification Search
CPC ............................................. G06F 11/36–3696
See application file for complete search history.

(56) References Cited

U.S. PATENT DOCUMENTS

| | | | |
|---|---|---|---|
| 3,601,674 A * | 8/1971 | Joslyn | H02P 7/293 388/812 |
| 7,095,416 B1 * | 8/2006 | Johns | A63F 13/10 345/522 |
| 8,180,163 B2 * | 5/2012 | Collomosse | H04N 7/025 382/232 |
| 9,164,874 B1 * | 10/2015 | Tomay | G06F 11/3672 |
| 9,172,952 B2 * | 10/2015 | Sogani | G06T 7/0002 |
| 9,424,881 B2 * | 8/2016 | Casagrande | G11B 27/34 |
| 10,068,318 B2 | 9/2018 | Dzyubak et al. | |
| 10,425,627 B2 * | 9/2019 | Zhang | G09G 3/006 |
| 10,673,720 B2 * | 6/2020 | Aygun | H04L 43/08 |
| 2004/0122790 A1 | 6/2004 | Walker et al. | |
| 2007/0179811 A1 | 8/2007 | Reiner | |
| 2007/0299945 A1 | 12/2007 | Lunsford | |
| 2009/0028238 A1 * | 1/2009 | Collomosse | H04N 7/025 375/240.01 |
| 2010/0042434 A1 | 2/2010 | Luo et al. | |

(Continued)

FOREIGN PATENT DOCUMENTS

| | | |
|---|---|---|
| EP | 1 094 416 | 4/2001 |
| EP | 3 567 525 | 11/2019 |

(Continued)

*Primary Examiner* — Todd Aguilera
(74) *Attorney, Agent, or Firm* — Baker Botts L.L.P.

(57) ABSTRACT

Method for testing software configured to display a plurality of digital images includes receiving a digital record, the digital record comprising a plurality of digital images having an order, each of the digital images having a visual marker to indicate a respective location within the order; providing instructions to display the digital images, the instructions including an expected sequence; running the software to display the digital images in accordance with the expected sequence; detecting an actual sequence by detecting each visual marker of a respective digital image to identify when each digital image is displayed; and comparing the actual sequence and the expected sequence to quantify the effectiveness of the software at displaying the digital record.

21 Claims, 11 Drawing Sheets

(56) References Cited

U.S. PATENT DOCUMENTS

| | | | |
|---|---|---|---|
| 2013/0343467 A1* | 12/2013 | Sogani | G06T 7/0002 |
| | | | 375/240.25 |
| 2015/0187119 A1* | 7/2015 | Masumoto | A61B 6/466 |
| | | | 345/424 |
| 2015/0326912 A1* | 11/2015 | Casagrande | G11B 27/005 |
| | | | 386/230 |
| 2017/0300619 A1 | 10/2017 | Rondeau | |
| 2018/0332261 A1* | 11/2018 | Zhang | H04N 21/4223 |
| 2019/0268249 A1* | 8/2019 | Aygun | G06Q 30/0277 |
| 2021/0265041 A1* | 8/2021 | Narayanan | G06F 16/58 |

FOREIGN PATENT DOCUMENTS

| | | |
|---|---|---|
| WO | WO 2006/041816 | 4/2006 |
| WO | WO 2014/149496 | 9/2014 |

* cited by examiner

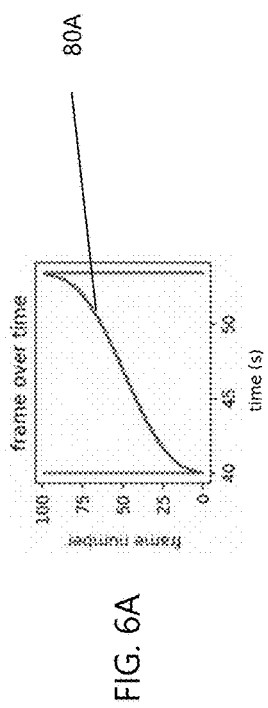
FIG. 6A
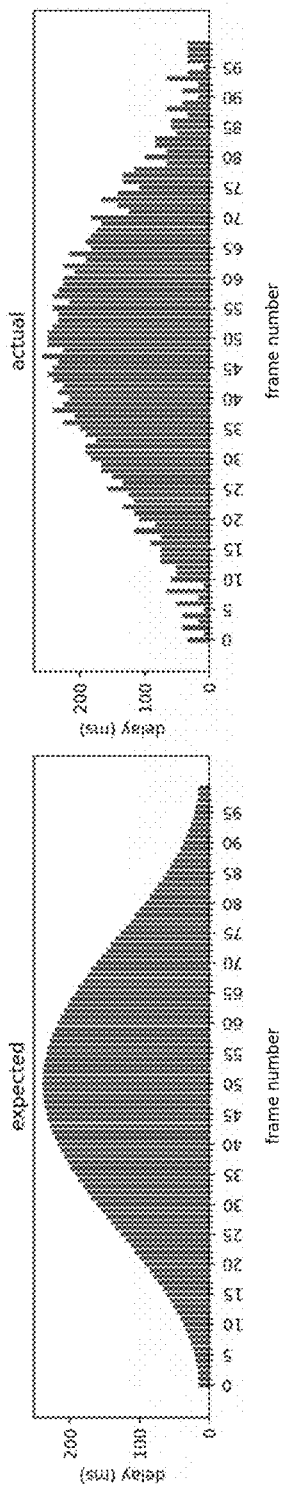
FIG. 6B
FIG. 6C
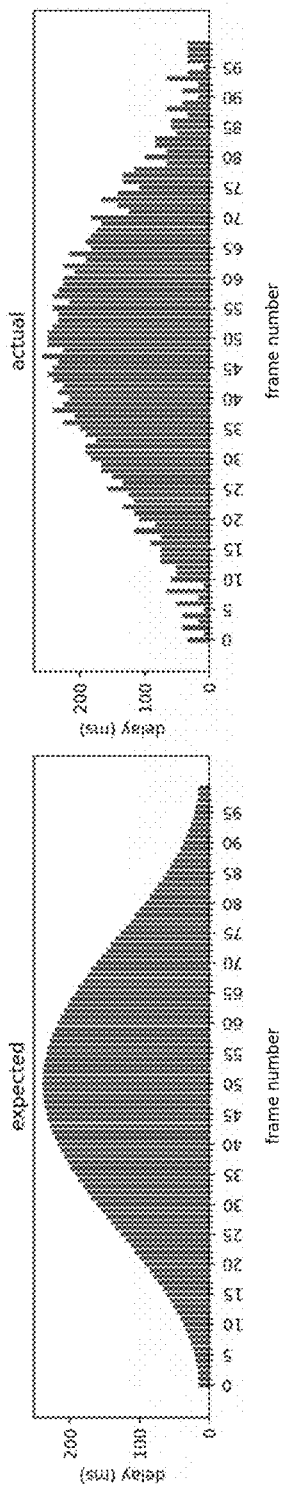
FIG. 6D
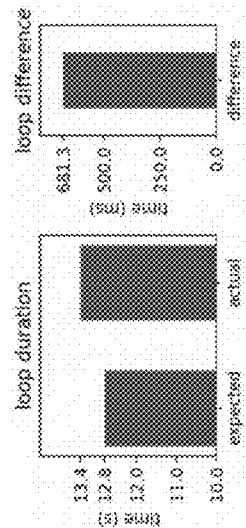
FIG. 6E
FIG. 6F
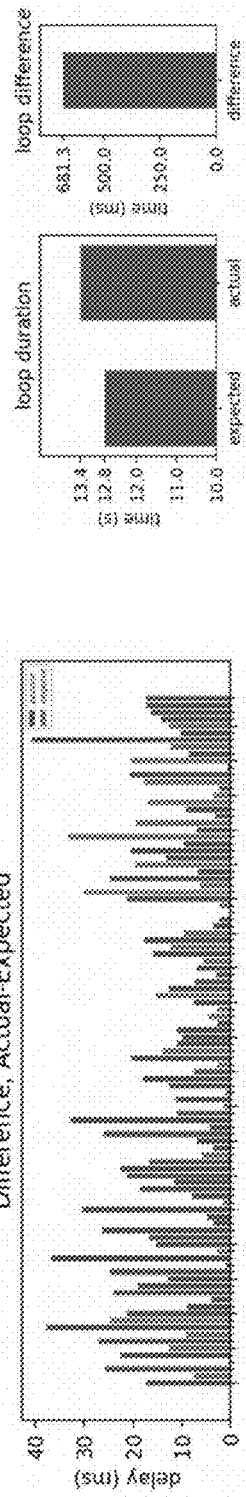

SYSTEMS AND METHODS FOR QUANTIFYING THE EFFECTIVENESS OF SOFTWARE AT DISPLAYING A DIGITAL RECORD

BACKGROUND

1. Field of Disclosed Subject Matter

The disclosed subject matter is directed to systems and methods for testing software configured to display a plurality of digital images, for example, medical images, and more specifically, digital images stored in Digital Imaging and Communications in Medicine ("DICOM") Objects. The systems and methods described herein can quantify a software's effectiveness at scrolling or playing a digital record including a plurality of digital images.

2. Description of Related Art

In medical imaging, Picture Archiving and Communication Systems ("PACS") are a combination of computers and networks dedicated to the storage, retrieval, presentation, and distribution of images. While medical information can be stored in a variety of formats, a common format of image storage is DICOM. DICOM is a standard in which, among other things, medical images and associated meta-data can be communicated from imaging modalities (e.g., x-ray (or x-rays' digital counterparts: computed radiography ("CR") and digital radiography ("DR")), computed tomography ("CT"), and magnetic resonance imaging ("MRI") apparatuses) to remote storage and/or client devices for viewing and/or other use. Medical image records stored in DICOM format can include a plurality of digital images related to a particular medical procedure, such as a plurality of individual scans obtained during an MII procedure or a plurality of individual images in a dynamic sequence, such as an ultrasound video.

When viewing medical images stored in DICOM format, it can be important for a user to be able to scroll through the digital images without lagging or skipping images. Likewise it can be important for images stored in DICOM to be played in a video loop (referred to in DICOM as Cine mode) without lagging or skipping images. Accordingly, software for processing and displaying medical images stored in a DICOM format can be tested to ensure that scrolling and/or Cine mode does not produce lag or skipped images.

Typically, testing such software has involved manual testing, wherein a tester manually steps through display capture footage of software performance frame-by-frame or uses other proxies to identify lag or skipped images. However, such manual testing can be laborious, time-consuming, and the quality of results can vary between testers.

Accordingly, there is a need for systems and methods for testing software configured to display a plurality of digital images, for example, in an autonomous fashion.

SUMMARY

The purposes and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as the appended figures.

To achieve these and other advantages and in accordance with the purpose of the disclosed subject matter, as embodied and broadly described the disclosed subject matter is directed to systems and methods for testing software configured to display a plurality of digital images. For example, a method for testing software configured to display a plurality of digital images can include receiving, at one or more computing devices, a digital record, the digital record comprising a plurality of digital images having an order, each of the digital images having a visual marker to indicate a respective location within the order; providing, at the one or more computing devices, instructions to display the digital images, the instructions including an expected sequence; running the software, at the one or more computing devices, to display the digital images in accordance with the expected sequence; detecting, at the one or more computing devices, an actual sequence by detecting each visual marker of a respective digital image to identify when each digital image is displayed; and comparing, at the one or more computing devices, the actual sequence and the expected sequence to quantify the effectiveness of the software at displaying the digital record.

The digital record can be a test record. The digital record can be a medical image record. The visual marker can be a progress bar. The visual marker can be a stamp added to each digital image. The visual marker can be one of a quick response ("QR") code and a bar code.

The expected sequence can include multiple human-readable metrics for verification. These human-readable metrics can include a test-display duration of each digital image. These human-readable metrics can include a corresponding instantaneous frames per second metric (FPS) for each digital image, respectively.

The actual sequence can include an actual-display duration for each digital image, respectively. Comparing the actual sequence and the expected sequence can include subtracting the test-display duration for each digital image from the actual-display duration for each image, respectively.

The expected sequence can include displaying each digital image in the order at a constant rate. The rate can be in a range of about 3 FPS to about 240 FPS.

In accordance with the disclosed subject matter, one or more computer-readable non-transitory storage media embodying software are provided. The software can be operable when executed to: receive, at one or more computing devices, a digital record, the digital record comprising a plurality of digital images having an order, each of the digital images having a visual marker to indicate a respective location within the order; provide, at the one or more computing devices, instructions to display the digital images, the instructions including an expected sequence; run software-to-be-tested, at the one or more computing devices, to display the digital images in accordance with the expected sequence; detect, at the one or more computing devices, an actual sequence by detecting each visual marker of a respective digital image to identify when each digital image is displayed; and compare, at the one or more computing devices, the actual sequence and the expected sequence to quantify the effectiveness of the software-to-be-tested at displaying the digital record.

In accordance with the disclosed subject matter, a system including one or more processors; and a memory coupled to the processors including instructions executable by the processors are provided. The processors can be operable when executing the instructions to: receive, at one or more computing devices, a digital record, the digital record comprising a plurality of digital images having an order, each of the digital images having a visual marker to indicate a respective location within the order; provide, at the one or more computing devices, instructions to display the digital images, the instructions including an expected sequence; run software-to-be-tested, at the one or more computing devices, to display the digital images in accordance with the expected sequence; detect, at the one or more computing devices, an actual sequence by detecting each visual marker of a respective digital image to identify when each digital image is displayed; and compare, at the one or more computing devices, the actual sequence and the expected sequence to quantify the effectiveness of the software-to-be-tested at displaying the digital record.

DRAWINGS

FIG. 6A shows a plot of an expected sequence in accordance with the disclosed subject matter. This figure depicts a subset of a larger dataset so as to comprise only one complete Cine loop spanning 100 individual image frames.

FIGS. 6B and 6C show plots of the expected and actual delays, respectively, for the expected sequence in FIG. 6A.

FIG. 6D shows a plot of the difference between the expected delays and actual delays in FIGS. 6B and 6C, respectively.

FIGS. 6E and 6F show plots of the expected and actual loop duration and the difference between the expected and actual loop duration, respectively, for the expected sequence in FIG. 6A.

DETAILED DESCRIPTION

Figure 1A:
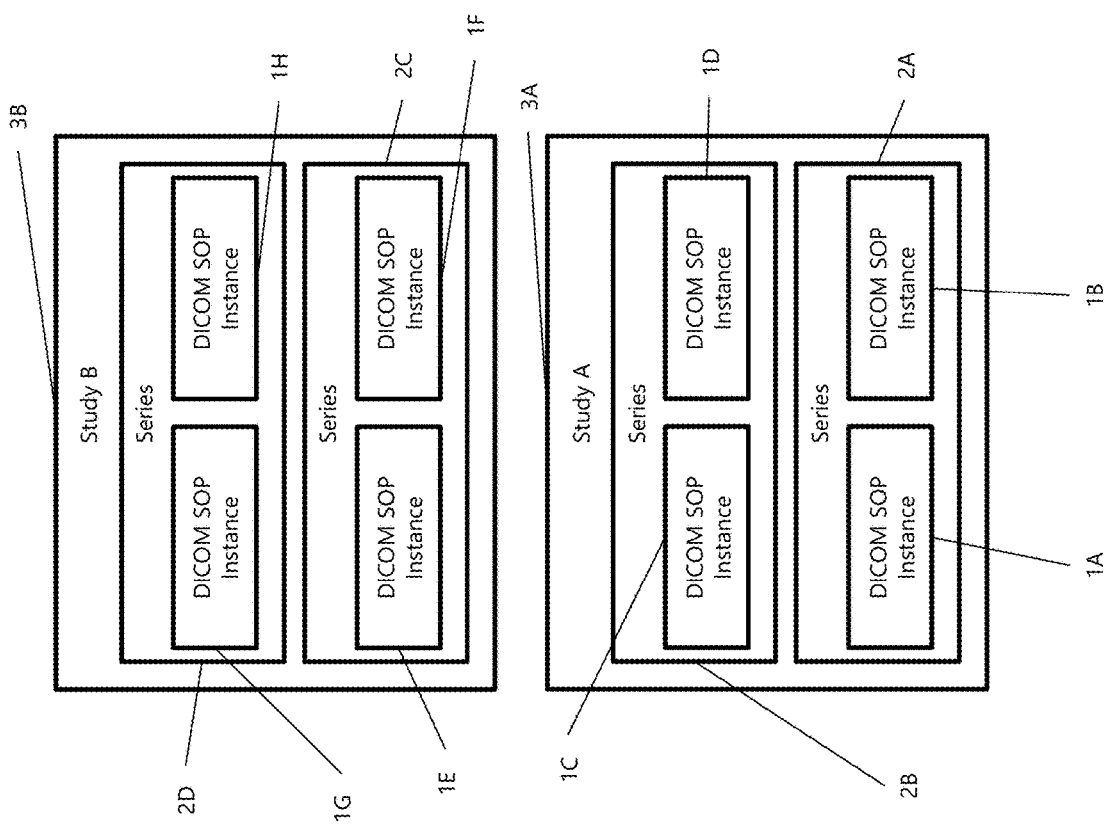
FIGS. 1A and 1B shows a hierarchy of medical image records that can be displayed in accordance with the disclosed subject matter.
Figure 1B:
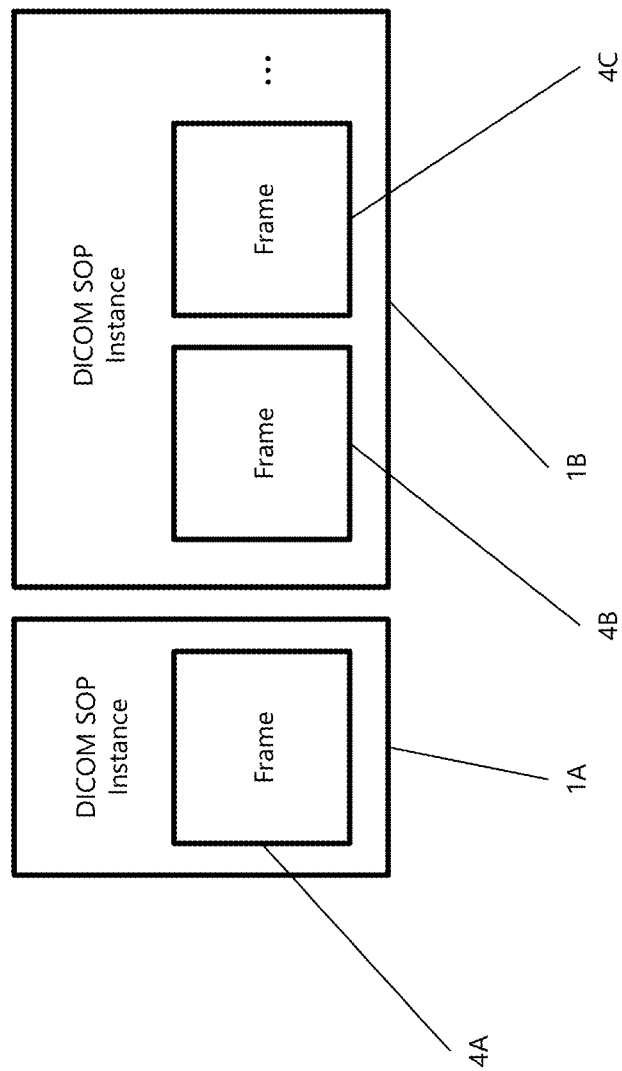

Reference will now be made in detail to various exemplary embodiments of the disclosed subject matter, exemplary embodiments of which are illustrated in the accompanying drawings. For purpose of illustration and not limitation, the systems and method are described herein with respect to testing software configured to display a plurality of digital images, and particularly, digital medical image records (also referred to as "medical image records"), specifically digital images stored as DICOM records. However, the methods and systems described herein can be used for testing software configured to display any electronic records (medical or otherwise) including a plurality of images. As used in the description and the appended claims, the singular forms, such as "a," "an," "the," and singular nouns, are intended to include the plural forms as well, unless the context clearly indicates otherwise. Accordingly, as used herein, the term medical image record can refer to one medical image record, or a plurality of medical image records. For example, and with reference to FIG. 1A for purpose of illustration and not limitation, as referred to herein a medical image record can include a single DICOM SOP Instance (also referred to as "DICOM Instance" and "DICOM image") 1 (e.g., 1A-1H), one or more DICOM SOP Instances 1 (e.g., 1A-1H) in one or more Series 2 (e.g., 2A-D), one or more Series 2 (e.g., 2A-D) in one or more Studies 3 (e.g., 3A, 3B), and one or more Studies 3 (e.g., 3A, 3B). With reference to FIG. 1B for purpose of illustration and not limitation, a DICOM SOP Instance 1 (e.g., 1A-1H) can include a single digital image (also referred to herein as "frame") 4 (e.g., 4A-4C) or a plurality of digital images 4 (e.g., 4A-4C). For example, DICOM Instance 1A includes a single frame 4A and DICOM Instance 1B includes a plurality of frames (e.g., 4B, 4C). FIG. 1B shows only two frames 4B,4C for purpose of clarity. The methods and systems described herein can be used with medical image records stored on PACS, however, a variety of records are suitable for the present disclosure and records can be stored in any system, for example a Vendor Neutral Archive ("VNA").

Figure 2:
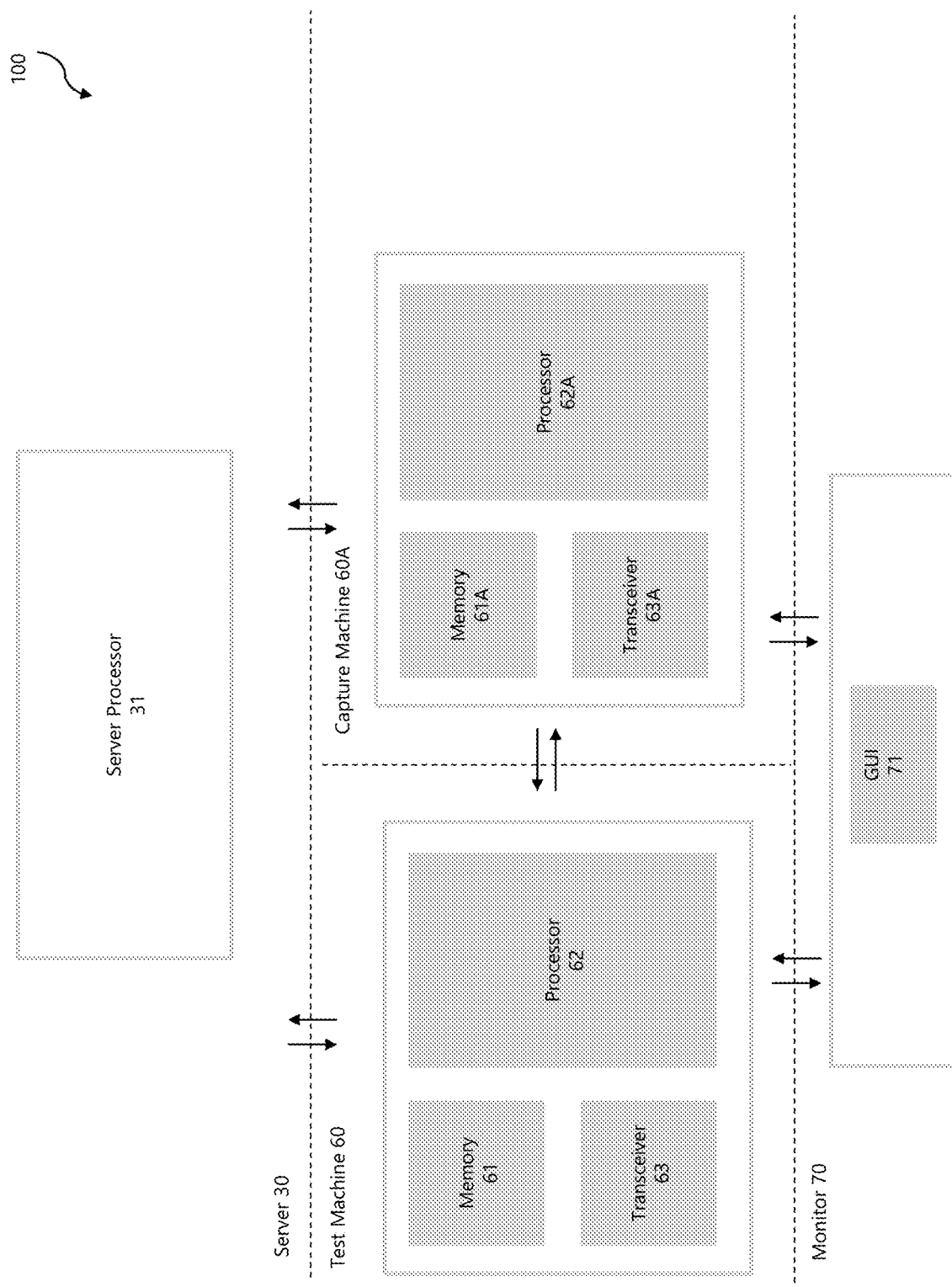
FIG. 2 shows the architecture of a system for testing software configured to display a plurality of digital images, in accordance with the disclosed subject matter.

Referring to FIGS. 1-2 for purpose of illustration and not limitation, the disclosed system 100 can be configured to test software configured to display a DICOM Study 3 (e.g., 3A, 3B) or DICOM Series 2 (e.g., 2A-2E) including one or more DICOM Instances 1 (e.g., 1A-1K) and a plurality of frames 4 (e.g., 4A-4C). Particularly, system 100 can test the software's ability to allow a user to scroll through frames 4 (e.g., 4A-4C) or play the frames 4 (e.g., 4A-4C) in Cine mode. The system 100 can include one or more computing devices defining a server 30, a test machine 60, a capture machine 60A, and a monitor 70 including graphical user interface ("GUI") 71. One or both of the test machine 60 and the capture machine 60A can each be coupled to the server 30 by a network. The network, for example, can be a Local Area Network ("LAN"), a Wireless LAN ("WLAN"), a virtual private network ("VPN"), or any other network that allows for any radio frequency or wireless type connection. For example, other radio frequency or wireless connections can include, but are not limited to, one or more network access technologies, such as Global System for Mobile communication ("GSM"), Universal Mobile Telecommunications System ("UMTS"), General Packet Radio Services ("GPRS"), Enhanced Data GSM Environment ("EDGE"), Third Generation Partnership Project ("3GPP") Technology, including Long Term Evolution ("LTE"), LTE-Advanced, 3G technology, Internet of Things ("JOT"), fifth generation ("5G"), or new radio ("NR") technology. Other examples can include Wideband Code Division Multiple Access ("WCDMA"), Bluetooth, IEEE 802.11b/g/n, or any other 802.11 protocol, or any other wired or wireless connection. Likewise, the test machine 60 can be coupled to the capture machine 60A by a network described above or any wireless or wired connection, such as a high-definition multimedia interface ("HDMI") connection.

One or both of test machine 60 and capture machine 60A can each be coupled to monitor 70 by a network described above or any wireless or wired connection, such as an HDMI connection. Monitor 70 can be a high resolution and high refresh rate monitor. For example, monitor 70 can have a refresh rate of 60 Hz, 120 Hz, 144 Hz, or 240 Hz. In accordance with the disclosed subject matter, monitor 70 can have a refresh rate of 120 Hz. In accordance with the disclosed subject matter, various monitors with similar or different refresh rates can be used to test the operation of the software on various types of hardware.

Test machine 60 can include memory 61, processor 62, and transceiver 63. Likewise capture machine 60A can include memory 61A, processor 62A, and transceiver 63A. Medical image records received by test machine 60 and capture machine 60A can be processed using one or more processors 62 and 62A, respectively. Processor 62 can be any hardware or software used to execute computer program instructions. These computer program instructions can be provided to a processor of a general purpose computer to alter its function to a special purpose, a special purpose computer, application-specific integrated circuit ("ASIC"), or other programmable digital data processing apparatus, such that the instructions, which execute via the processor of the workstation 60 or other programmable data processing apparatus, implement the functions/acts specified in the block diagrams or operational block or blocks, thereby transforming their functionality in accordance with embodiments herein. The processor 62 can be a portable embedded micro-controller or micro-computer. For example, processor 62 can be embodied by any computational or data processing device, such as a central processing unit ("CPU"), digital signal processor ("DSP"), ASIC, programmable logic devices ("PLDs"), field programmable gate arrays ("FPGAs"), digitally enhanced circuits, or comparable device or a combination thereof. The processor 62 can be implemented as a single controller, or a plurality of controllers or processors. Processor 62A of capture machine 60A can be embodied in any of the arrangements described above with respect to processor 62, and can be implemented similarly or differently than processor 62.

Test machine 60 can send and receive image records from server 30, capture machine 60A, and monitor 70 using transceiver 63. Likewise capture machine 60A can send and receive image records from server 30, test machine 60, and monitor 70 using transceiver 63A. Transceiver 63 can, independently, be a transmitter, a receiver, or both a transmitter and a receiver, or a unit or device that can be configured both for transmission and reception. In other words, transceiver 63 can include any hardware or software that allows test machine 60 to communicate with server 30, capture machine 60A, and/or monitor 70. Transceiver 63 can be a wired or a wireless transceiver or both. When wired, transceiver can include an HDMI port. When wireless, the transceiver 63 can be implemented as a remote radio head which is not located in the device itself, but in a mast. While FIG. 2 only illustrates a single transceiver 63, workstation 60 can include one or more transceivers 63. Transceiver 63A of capture machine 60A can be embodied in any of the arrangements described above with respect to transceiver 62, and can be implemented similarly or differently than transceiver 63.

Memory 61 can be a non-volatile storage medium or any other suitable storage device, such as a non-transitory computer-readable medium or storage medium. For example, memory 61 can be a random-access memory ("RAM"), read-only memory ("ROM"), hard disk drive ("HDD"), erasable programmable read-only memory ("EPROM"), electrically erasable programmable read-only memory ("EEPROM"), flash memory or other solid-state memory technology. Memory 61 can also be a compact disc read-only optical memory ("CD-ROM"), digital versatile disc ("DVD"), any other optical storage, magnetic cassettes, magnetic tape, magnetic disk storage or other magnetic storage devices, or any other physical or material medium which can be used to tangibly store the desired information or data or instructions and which can be accessed by a computer or processor. Memory 61 can be either removable or non-removable. Memory 61A of capture machine 60A can be embodied in any of the arrangements described above with respect to memory 61, and can be implemented similarly or differently than memory 61.

System 100 is shown with test machine 60 and capture machine 60A, which can reduce the load on test machine 60 during operation. For example, test machine 60 can run the software to be tested and capture machine 60A can detect the output from test machine 60. Specifically, the system 100 can record and encode high-speed, high-resolution videos using a hardware pass-through so the process can be performed on the same system 100 using a dedicated graphics processing unit ("GPU") for encoding, or, as shown in FIG. 2, use a secondary workstation with CPU encoding (i.e., capture machine 60A). Using separate computers can prevent the strain of high performance video encoding from influencing test machine performance. However, in accordance with the disclosed subject matter, test machine 60 and capture machine 60A can be implemented together in a single machine including one or more of the features described above.

Server 30 can include a server processor 31. The server 30 can be a computer. The server processor 31 can be any hardware or software used to execute computer program instructions. These computer program instructions can be provided to a processor of a general purpose computer to alter its function to a special purpose, a special purpose computer, ASIC, or other programmable digital data processing apparatus, such that the instructions, which execute via the processor of the client station or other programmable data processing apparatus, implement the functions/acts specified in the block diagrams or operational block or blocks, thereby transforming their functionality in accordance with embodiments herein. In accordance with the disclosed subject matter, the server processor 31 can be a portable embedded micro-controller or micro-computer. For example, server processor 31 can be embodied by any computational or data processing device, such as a CPU, DSP, ASIC, PLDs, FPGAs, digitally enhanced circuits, or comparable device or a combination thereof. The server processor 31 can be implemented as a single controller, or a plurality of controllers or processors.

Figure 3:
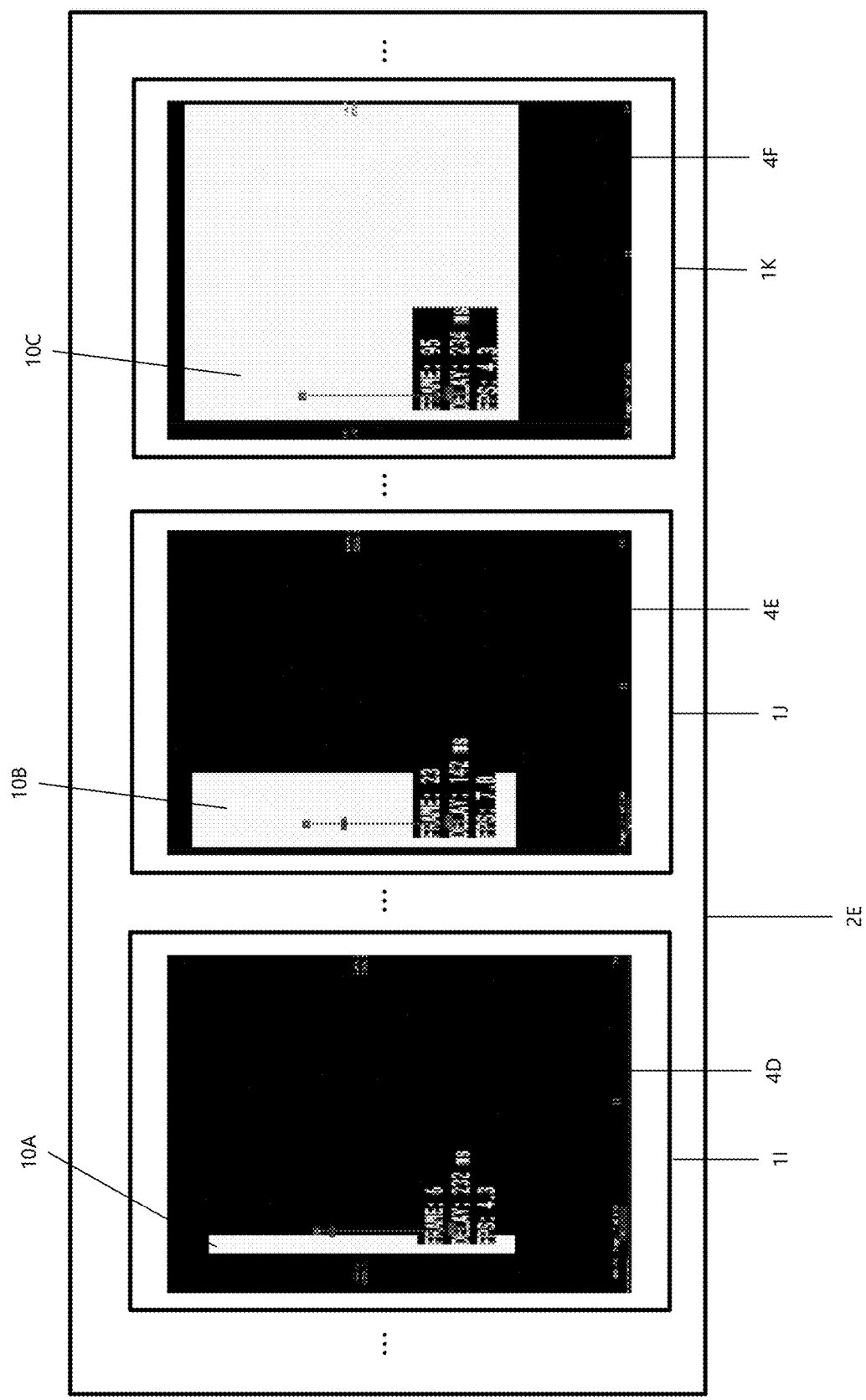
FIG. 3 shows a digital record that can be used for testing software configured to display a plurality of digital images, in accordance with the disclosed subject matter.

In accordance with the disclosed subject matter, a variety of digital records can be used to test the software. Referring to FIG. 3, for purpose of illustration and not limitation, Series 2E can be a contrived test record, that can be used to test software. Series 2E can be configured with 100 DICOM SOP Instances 1 (e.g., 1I-1K), with each DICOM SOP Instance 1 (e.g., 1I-1K) having a single frame 4 (e.g., 4D-4F). Each frame 4 (e.g., 4D-4F) can have a location within an order from the first $1^{st}$ to $100^{th}$ frame 4 (e.g., 4D-4F). FIG. 3 shows only three DICOM SOP Instances 1I-1K for purpose of clarity. The frames 4 (e.g., 4D-4F) in Series 2E are contrived test images (rather than real-world medical images). The frames 4D-4F are configured to be similar size (e.g., pixel size and number, and file size) to a typical frame 4 (e.g., 4D-4F) and can include similar information. Test images can be designed to include the minimum required DICOM tags for each modality using a representative bit-depth for that modality. For example, an X-Ray Angiographic image ("XA") can use 16 bit little endian pixel storage while utilizing only 12 bits per pixel. Minimal DICOM tags can aid in establishing a proper performance baseline by eliminating unnecessary image features and reducing the file size. Note that it can be necessary to implement some non-mandatory tags for brightness and contrast to ensure consistency in image display. However, instead of medical images, frames 4 (e.g., 4D-4F) each include a progress bar 10 (e.g., 10A-10C). The progress bar 10 (e.g., 10A-10C) can operate as a visual marker to uniquely identify each frame 4 (e.g., 4D-4F) and to identify the particular location of each frame 4 (e.g., 4D-4F) within Series 2E. For example, Frame 4D can be the $6^{th}$ frame 4 (e.g., 4D-4F) (i.e., stored in the sixth DICOM SOP Instance 1 (E.g., 1I-1K)) in Series 2E. Accordingly, frame 4D can include progress bar 10A that is 6 percent filled in. Frame 4E can be the $23^{rd}$ frame 4 (e.g., 4D-4F) (i.e., stored in the $23^{rd}$ DICOM SOP Instance 1 (E.g., 1I-1K)) in Series 2E, and can include progress bar 10B that is 23 percent filled in. Frame 4F can be the $95^{th}$ frame 4 (e.g., 4D-4F) (i.e., stored in the $95^{th}$ DICOM SOP Instance 1 (E.g., 1I-1K)) in Series 2E, and can include progress bar 10C that is 95 percent filled in. Test images can include human-readable metrics added to their pixel data to aid in verification of the accuracy of the testing apparatus so that session recordings can be audited by a user to verify, for example, skipped images.

Figure 4:
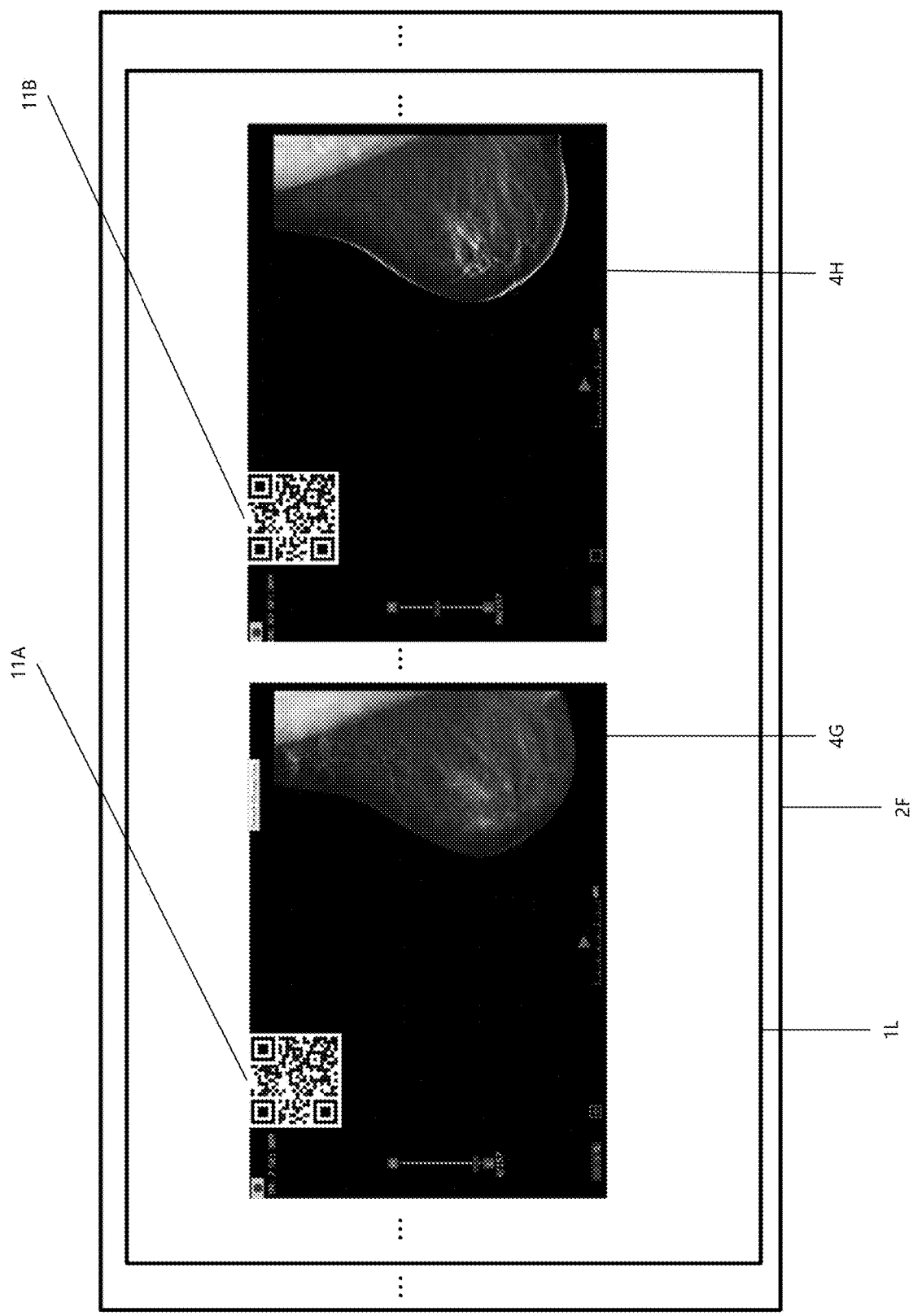
FIG. 4 shows a medical image record that can be used for testing software configured to display a plurality of digital images, in accordance with the disclosed subject matter.

Additional and/or alternative Studies 3 (e.g., 3A, 3B) and/or Series 2 (e.g., 2A-2F) can be used as a test record. For example, the digital record used to test the software can be a medical image stored in DICOM format with a stamp added to each frame 4 (e.g., 4A-C) to act as the visual marker. Referring to FIG. 4, for purpose of illustration and not limitation, the Series 2F can be a medical image record. For example, Series 2F can include a number (for example 100) DICOM SOP Instances 1 (e.g., 1L) with each DICOM SOP Instance 1 (e.g., 1L) having a number (for example 10) frames 4 (e.g., 4G, 4H). Each frame 4 (e.g., 4G, 4H) can have a location within an order from the first $1^{st}$ to $1000^{th}$ frame 4 (e.g., 4G, 4H). FIG. 4 shows only one DICOM SOP Instances 1L and two frames 4G, 4H for purpose of clarity. Series 2F can include a plurality of medical image frames, with each scan stored as a frame 4 (e.g., 4G, 4H) within a DICOM SOP Instance 1 (e.g., 1L, 1M). Each frame 4 (e.g., 4G, 4H) can include a visual marker, such as stamp 11 (e.g., 11A, 11B) in the form of a QR code. For the purposes of illustration and not limitation frame 4 (e.g. 4G, 4H) depicts a breast tomosynthesis (BT) image. Although shown as a QR code, stamp 11 (e.g., 11A, 11B) can be any format that can uniquely identify each frame 4 (e.g., 4G, 4H) and its respective location with in the Series 2F. For example, the stamp 11 (e.g., 11A, 11B) can be a bar code, progress bar, or another visual marker that can uniquely identify each frame 4 (e.g., 4G, 4H) and provide other information, as necessary. In addition to uniquely identifying the frame 4 (e.g., 4G, 4H) and location, the stamp 11 (e.g., 11A, 11B) can contain additional information, such as Study 3 (e.g., 3A, 3B), Series 2 (e.g., 2F), DICOM Instance 1 (e.g., 1L), and/or patient information. For the purpose of illustration and not limitation, the additional information can be used to characterize software performance under operations beyond simple scrolling and cine such as simultaneous playback, layout rearrangements, synchronized anatomical views, or comparison across previous studies (i.e. "priors").

In operation, and with reference to FIGS. 2-5B for purpose of illustration and not limitation, system 100 can be used to test how well software can display Series 2E. Series 2E can be received by test machine 60, which can have the software that will be tested installed thereon. Instructions can be provided to test machine 60 to use the software under test (also referred to herein as "software-to-be-tested") to display the frames 4 (e.g., 4D-4F) in Series 2E in an expected sequence. The instructions can come from the server processor 31 on server 30. The instructions can be provided from custom software that provides automatic remote administration of the display performance protocol. Alternatively or additionally, the instructions can be provided from capture machine 60A and/or via GUI 71. One or more instructions can be provided from a library of test protocols. In accordance with the disclosed subject matter test protocols can be customized for particular users, for example, using existing technologies to record user workflows for accurate playback at the hardware level (e.g., custom mouse hardware) or at the software level (e.g., macro tools such as Selenium IDE, Autohotkey, or other similar software).

Test machine 60 can run the software to display the frames 4 (e.g., 4D-4F) in accordance with the expected sequence. For example, the expected sequence can be configured to run the frames 4 (e.g., 4D-4F) in order from the $1^{st}$ to the $100^{th}$ frame 4 (e.g., 4D-4F) in Cine mode at a particular rate, for example, 4 FPS. Additional and/or alternative expected sequences can be used, as described in greater detail below. As an example and not by way of limitation, during the progress of the expected sequence, the display output for frame 4D can be sent from test machine 60 to capture machine 60A and capture machine 60A can perform a display capture. As such, capture machine 60A can detect the progress bar 10A of frame 4D and can determine whether, when, and how long frame 4D is displayed. The capture machine 60A can be configured to mirror the maximum refresh rate of the monitor 70 so as to detect influence of monitor refresh rate on overall software performance. Capture machine 60A can also allow the display output to pass through to the monitor 70, and frame 4D can be displayed on GUI 71. Similarly, during the process of the expected sequence, the display output for frame 4E can be sent from test machine 60 to capture machine 60A and capture machine 60A can perform a display capture. As such, capture machine 60A can detect the progress bar 10B of frame 4E and can determine whether, when, and how long frame 4E is displayed. Capture machine 60A can also allow the display output to pass through to the monitor 70, and frame 4E can be displayed on GUI 71. Likewise, during the progress of the expected sequence, the display output for frame 4F can be sent from test machine 60 to capture machine 60A and capture machine 60A can perform a display capture. As such, capture machine 60A can detect the progress bar 10C of frame 4F and can determine whether, when, and how long frame 4F is displayed. Capture machine 60A can also allow the display output to pass through to the monitor 70, and frame 4F can be displayed on GUI 71. Accordingly, during the expected sequence, capture machine 60A can detect an actual sequence including whether, when and how long each Frame 4 (e.g., 4D-4F) is displayed by performing a display capture and detecting the respective progress bar 10 (e.g., 10A-10C). The expected sequence and the actual sequence can then be compared to quantify the effectiveness of the software at displaying Series 2E. System 100 can additionally or alternatively be used to test how effectively software can display Series 2F in the same manner described above with regard to Series 2E, and by utilizing stamps 11 (e.g., 11A, 11B). That is, during an expected sequence, capture machine 60A can detect an actual sequence including whether, when and how long each Frame 4 (e.g., 4G, 4H) is displayed by performing a display capture and detecting the respective stamps 11 (e.g., 11A, 11B). As noted above, stamps 11 (e.g., 11A, 11B) can encode information including the frame 4 (e.g., 4G, 4H), location, Study 3 (e.g., 3A, 3B), Series 2 (e.g., 2F), DICOM Instance 1 (e.g., 1L) and/or patient information so as to enable a wider variety of diagnostic or daily expected sequences such as those described above.

Figure 5A:
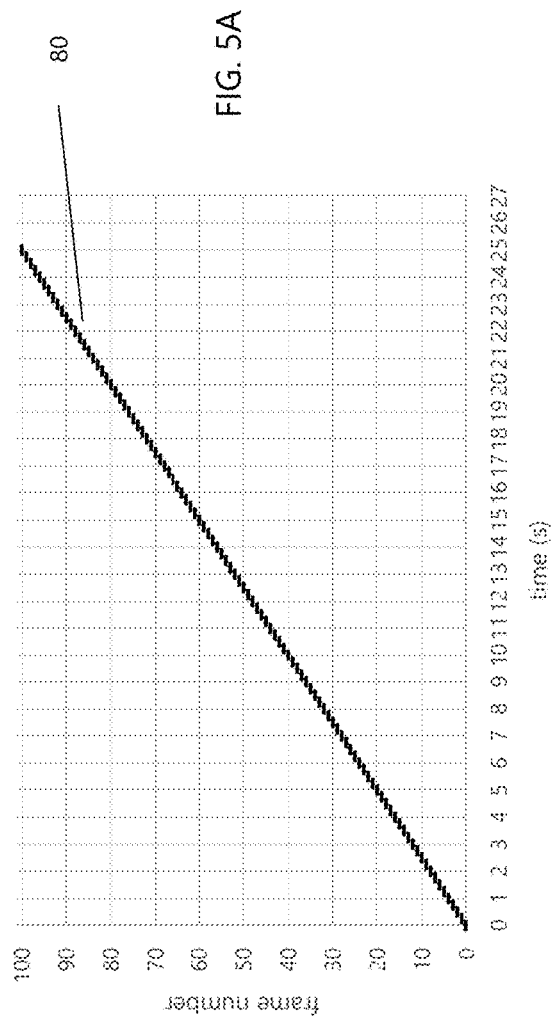
FIGS. 5A and 5B show plots of an expected sequence and actual sequence, respectively, in accordance with the disclosed subject matter.
Figure 5B:
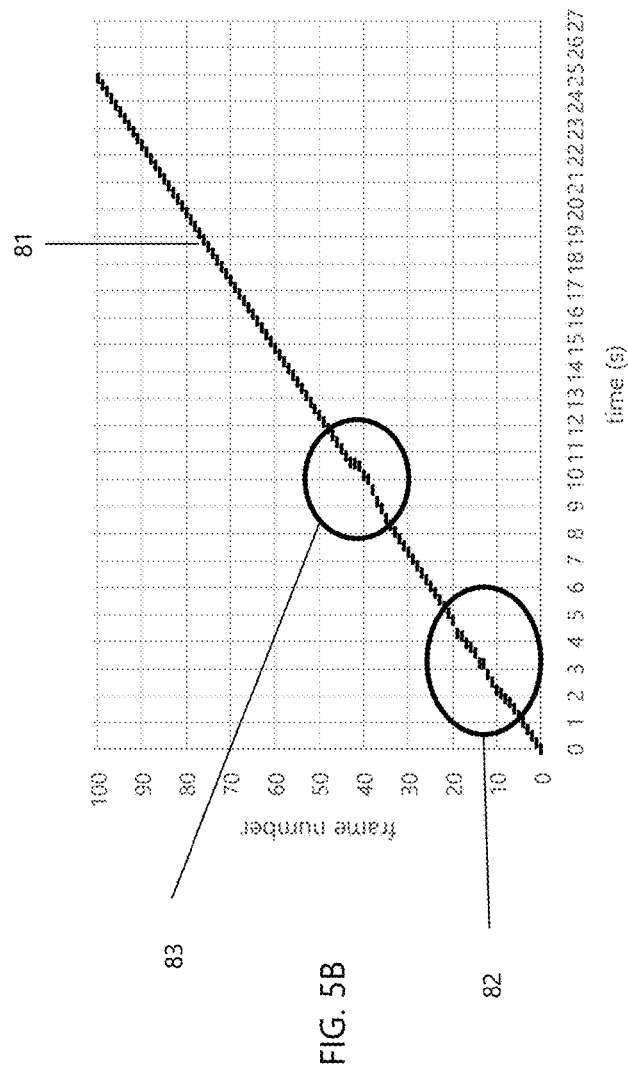

FIGS. 5A and 5B show plots of the expected sequence and actual sequence described above, respectively. The x axis shows time in seconds and the y axis shows the frame 4 (e.g., 4D-4F) number. The expected sequence include running the frames 4 (e.g., 4D-4F) in order from the 1$^{st}$ to the 100$^{th}$ frames 4 (e.g., 4D-4F) in Cine mode at a rate of 4 FPS. Accordingly, the plot of the expected sequence includes line 80 having a constant slope of 4 FPS. By contrast, in FIG. 5B, the line 81 associated with actual sequence is not the same as line 80 because the software displayed Series 2E imperfectly. Particularly, there are aberrations at regions 82 and 83, indicating that there was some lag and rushed frames 4 (e.g., 4D-4F) in displayed frames 10-20 and 37-45. If any frames 4 (e.g., 4D-4F) had never been displayed (i.e., skipped), there would be a missing marker in line 81 at that frame. Line 81 and line 80 can be compared to quantify the effectiveness of the software under test at displaying the digital record. For example, the system 100 can determine whether the aberrations at regions 82 and 83 are acceptable or not acceptable within the software development process (e.g., within or without an expected tolerance). The plots shown in FIGS. 5A and 5B are trimmed to only show a single loop iteration. The expected and actual sequences shown are based on a constant speed cine, but the analysis shown here can be useful to visually show other situations, for example scrolling or non-uniform display rates. Simultaneous playback performance, which can include multiple overlay plots can also be tested. Additional and/or alternative comparisons between the expected and the actual sequence can be performed using various statistical manipulations of the actual sequence, as described in greater detail below.

In accordance with the disclosed subject matter, a variety of expected sequences can be used. For example, the expected sequence can involve playing through each frame 4 (e.g., 4A-4H) in Cine mode at a constant rate, for example, anywhere between 1 FPS and 240 FPS, for example, 4 FPS, 15 FPS, 30 FPS, 60 FPS, or 120 FPS. Additionally or alternatively, the expected sequence can test multiple simultaneous cine images. The expected sequence can include a test-display duration for each frame 4 (e.g., 4A-4H), which can indicate how long each frame 4 (e.g., 4A-4H) should be displayed. Alternatively or additionally, the expected sequence can vary the rate of display of the frames 4 (e.g., 4A-4H) during the expected sequence. For example, and with reference to FIG. 6A for purpose of illustration and not limitation, a plot of a variable expected sequence includes line 80A having a variable slope over time. A shown in FIG. 6A, the expected sequence can involve initially displaying each frame 4 (e.g., 4A-4H) at a relatively high rate (e.g., at about 20 FPS), then displaying each frame 4 (e.g., 4A-4H) at a relatively lower rate (e.g., at about 8 FPS), and finally displaying each frame 4 (e.g., 4A-4H) at the relatively high rate (e.g., at about 20 FPS) again. Alternative expected sequences can include relatively slow rates at the beginning and end with a relatively higher rate in the middle, or relatively high or low rates at the beginning or end. The expected sequences can utilize a contrived digital record with a sinusoidal pattern. Such a pattern can exhibit the unique property that it smoothly transitions between a wide variety of rates of change and can feature a seamless transition between loops. This can facilitate identifying delays, skips, issues with the looping, or other software defects. Additionally or alternatively, the expected sequence can simulate a scrolling pattern. Scrolling patterns can be actuated from a variety of methods, such as mouse wheel scrolling, arrow keys, or mouse movements—each with their own specific visual signature. Scrolling can be conducted in an automated fashion to replicate an anatomical (i.e. back and forth) or sweep (i.e. contrived increasing rates of change so as to characterize a nonlinear scrolling system) scrolling. In accordance with the disclosed software, the scroll pattern can be based on a manual scroll. For example, a record of user scrolling workflows can be recorded with hardware (e.g. recording mouse) or software methods (e.g., macro software such as Autohotkey or Selenium IDE) In accordance with the disclosed subject matter, the expected sequence can include more than one loop through a respective Series (e.g., 2A-2F), for example, the sequence can include 5, 15, 25, or 100 loops.

The expected sequence plotted in FIG. 6A illustrates the technique in a particularly challenging software testing case in the DICOM Frame Time Vector (i.e. non-uniform display frame rate). Particularly, the expected sequence illustrates the sinusoidal contrived data referenced above. The expected sequence and the actual sequence can be compared and analyzed in a variety of ways. FIGS. 6B-F illustrate analyses that can be performed on the expected sequence plotted in FIG. 6A. The comparison techniques can make differences (e.g., delays, missed frames 4 (e.g., 4A-4H)) easy to identify visually by a user regardless of rate of change. Furthermore, even if the error is not uniformly distributed, it is possible to identify software defects with demanding FPS transitions, FPS targets, or looping. For example, FIGS. 6B and 6C show, for purpose of illustration and not limitation, a plot of the expected and actual, respectively, delay (in milliseconds) for each frame 4 (e.g., 4D-4F) of Series 2E using the expected sequence plotted in FIG. 6A. As described herein, delay for each frame 4 (e.g., 4D-4F) of the contrived progress bar example is calculated by a multi-step process. First, the digital recording is cropped to an arbitrarily tall slice spanning the full width of the DICOM pixel data. That matrix is then simplified into a binary matrix according to an appropriate threshold and that matrix is summed at each time step to produce a vector of pixel areas at each time step. The final step is to normalize these pixel areas into frame numbers by dividing by the maximum pixel area observed (i.e. that of the final progress bar frame) and scaling by the number of frames. This results in a time series identifying each respective frame of the DICOM image series, which is to say input (FIG. 3) becomes output (FIG. 5B). This is the raw data that can be further examined as detailed in the remaining figures (FIG. 6). FIG. 6D provides, for each frames 4 (e.g., 4D-4F) of Series 2E, the difference between the actual delay and the expected delay. FIG. 6E shows the expected and actual time (in seconds) of the loop for Series 2E using the expected sequence plotted in FIG. 6A, and FIG. 6F shows the difference in time (in milliseconds) between the expected and actual loop time. As such, the system 100 can identify deviations from expected at the individual frame 4 (e.g., 4A-4F) level (FIG. 6D) and overall (FIGS. 6E-F). The plots shown were recorded at 120 Hz. Temporal resolution is limited only by the refresh rate of the monitor 70 which determined the upper bound of the recording frame-rate. Accordingly, for example, with a 240 Hz monitor arrangement display timings can be resolved with approximately 4 ms precision in the individual frame plots (e.g., FIG. 6D).]

In accordance with the disclosed subject matter, the actual sequence can be analyzed to determine the average frame duration over one or a plurality of loops. Additionally or alternatively, the average FPS over one or a plurality of loops and/or the display time (1/FPS; also referred to as actual-display duration) over one or a plurality of loops can be calculated for the actual sequence and compared to the expected value based on the expected sequence. Additionally or alternatively, expected and actual outcomes can be analyzed for other forms of input to system 100. For example, scrolling inputs can be plotted in units of pixels (i.e., software level) or mouse deltas (i.e., hardware level). Likewise any number of key presses, user actions, and other stimuli can be cross-correlated with outcomes for sophisticated plots. Another example can include collecting memory usage statistics over time while using a Fast Fourier Transform (FFT) to try and equate periodicity of display performance with garbage collection cycles of the software under test or some other phenomena. Additionally or alternatively system 100 can check for skipped frames 4 (e.g., 4A-4F) (i.e., frames 4 (e.g., 4A-4F) that are never displayed despite instructions in the expected sequence to display the frame 4 (e.g., 4A-4F)). Any of these analyses described can be compared to the expected results based on the expected sequence. Furthermore, results from individual loops within an expected sequence can be compared to results from other loops within the expected sequence.

In accordance with the disclosed subject matter, the comparison between the expected sequence and the actual sequence can be used to identify issues with the software (e.g., in Cine mode or with scrolling), issues with the hardware that the software is running on, issues with certain file types, and changes between versions of software over time. [In the case of skipped frames 4 (e.g., 4A-4F), for example, running the same testing protocol across configurations (e.g. hardware specification, software configuration, network connections, monitor resolution and refresh rate, and other configurations) can allow simple, automated isolation of software issues with swiftness and overall precision. Indeed, issues like skipped frames 4 (e.g., 4A-4F) are not possible for a human to identify at high speeds. This approach can be fully automated as part of daily testing for software defects that may have been introduced, for example in an overnight build.

Figure 7:
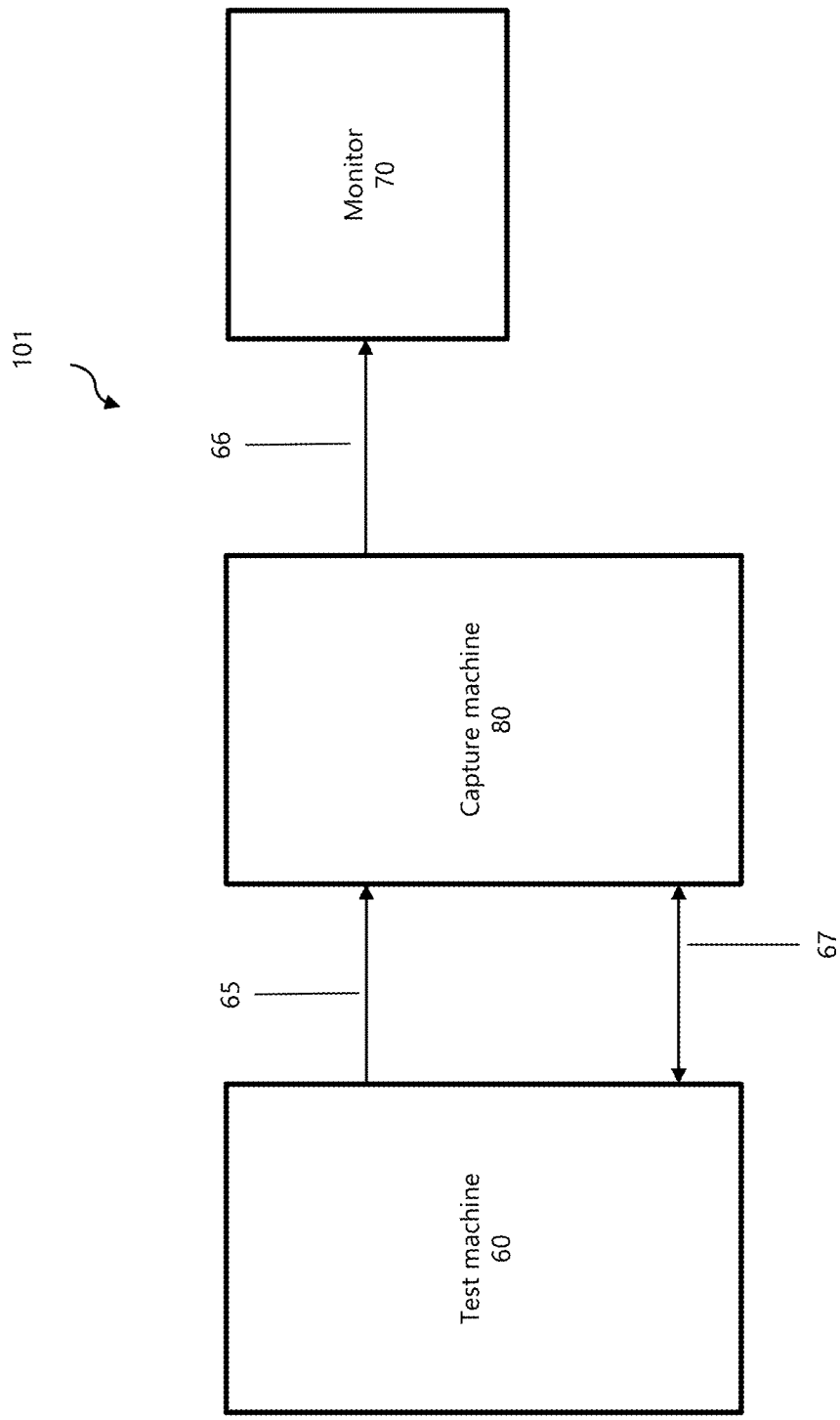
FIG. 7-9 show the architecture of a system for testing software configured to display a plurality of digital images in accordance with the disclosed subject matter.
Figure 8:
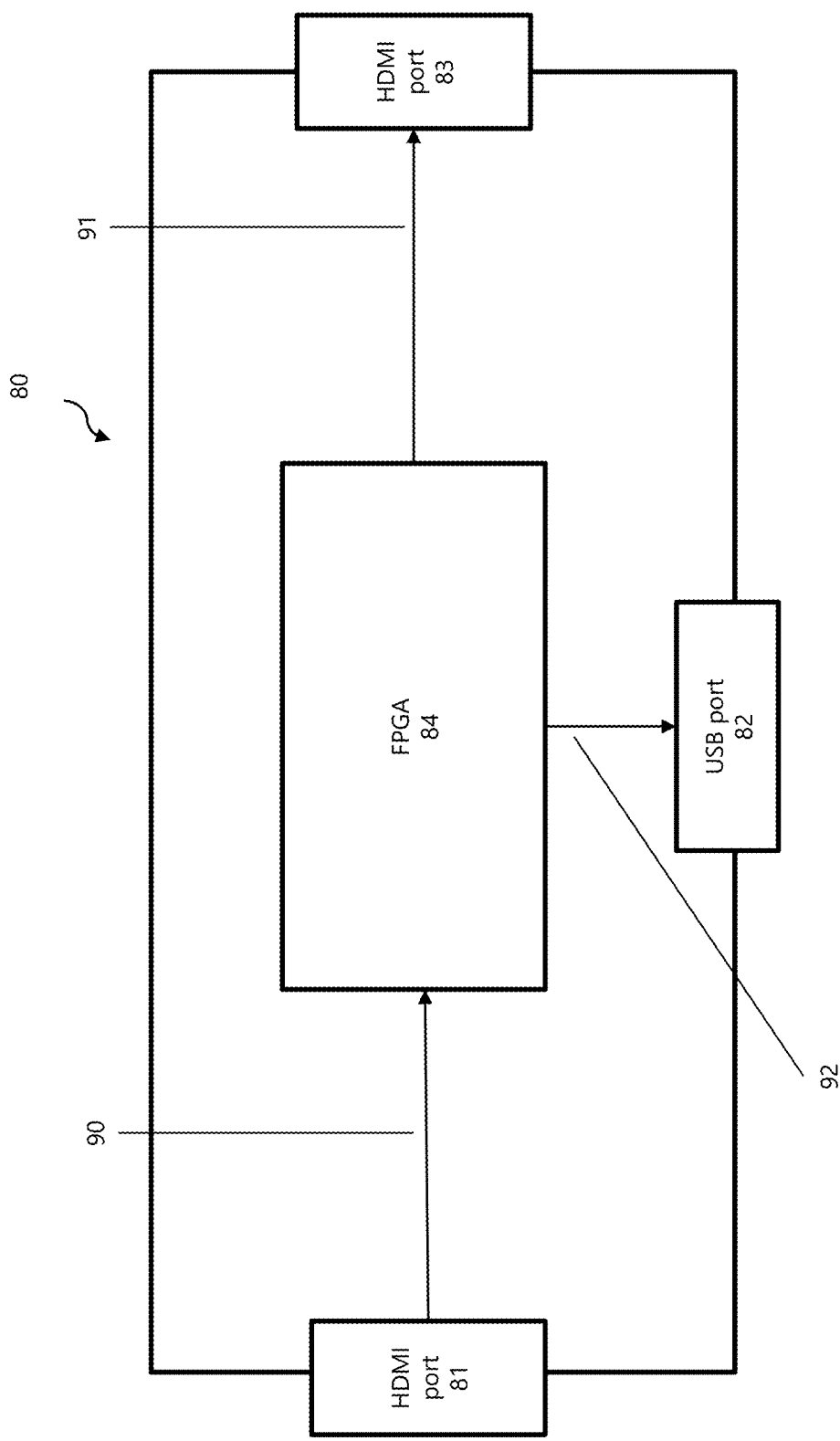
Figure 9:
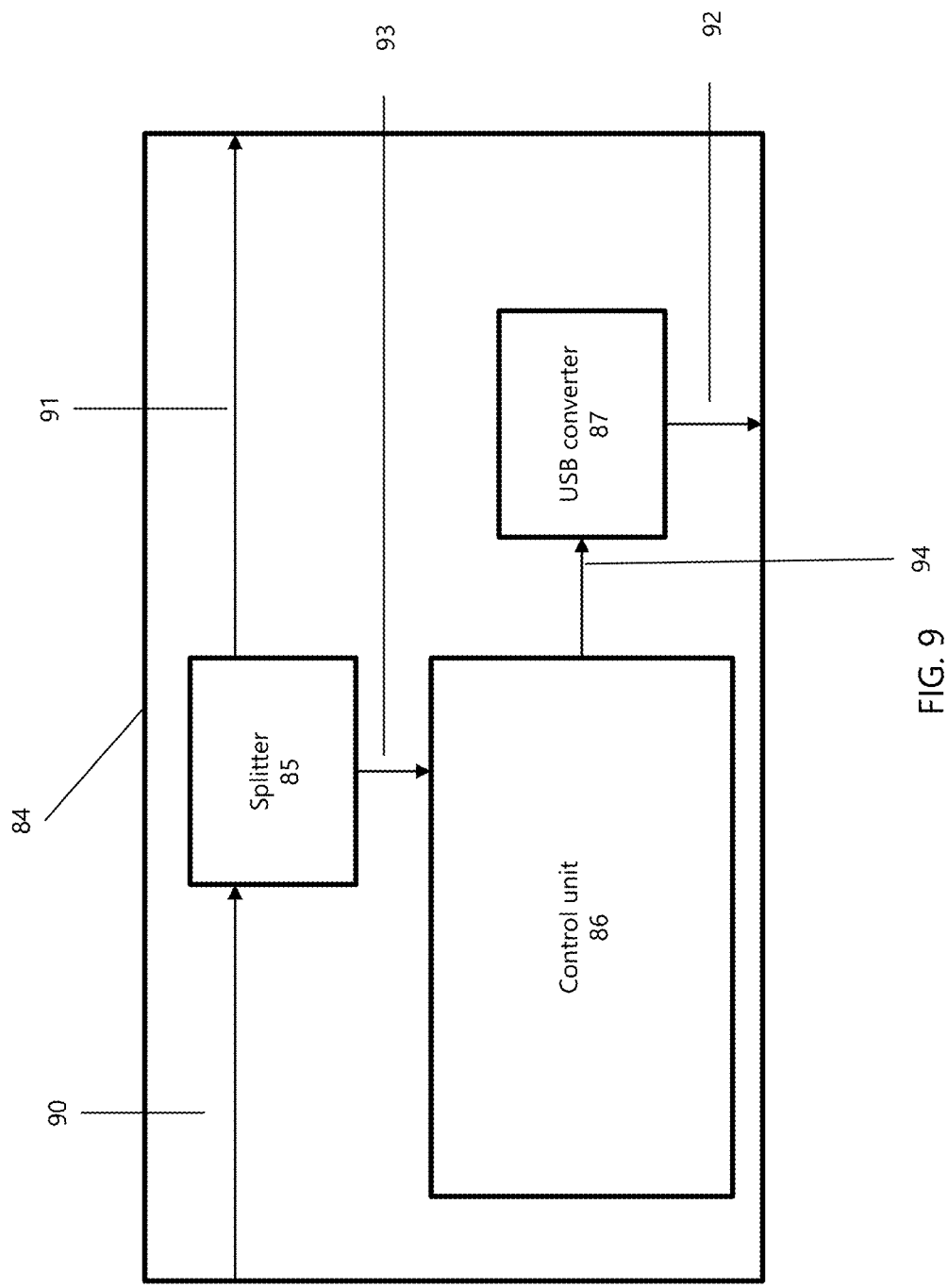

Referring to FIGS. 7-9 for purpose of illustration and not limitation, system 101 can be configured to test software configured to display a DICOM Study 3 (e.g., 3A, 3B) or DICOM Series 2 (e.g., 2A-2E) including one or more of DICOM images 1 (e.g., 1A-1K) and a plurality of frames 4 (e.g., 4A-4F). System 101 can have some or all of the features described above with regard to system 100, and can perform some or all of the same tests and analysis described above with regard to system 100. System 101 can include test machine 60 (described above), capture machine 80, and monitor 70 (described above). Capture machine 80 can be implemented on a portable device, such as a stick drive device. Capture machine 80 can include HDMI input port 81, USB output port 82, HDMI output port 83, and FPGA 84. A schematic of FPGA 84 is provided in FIG. 8. FPGA 84 can include splitter 85, control unit 86 (which can include a processor and memory, among other components), and USB converter 87.

Display output information can run on line 65 from the test machine 60 to capture machine 80. The display output information can enter capture machine 80 at HDMI input port 81. The display output information can run along line 90 to splitter 84 on FPGA 84, and display output information can be sent both along line 91 to HDMI output port 82 and along line 93 to control unit 86. The display output information can run from HDMI output port 82 to monitor 700 along line 66. Control unit 86 can detect the actual sequence, as described above. That data can be sent along line 94 to USB converter 87 and then along line 92 to USB output port 82. The USB data, and other data and control information can travel between the USB port 82 of the capture machine 80 and test machine 60 along line 67.

Figure 10:
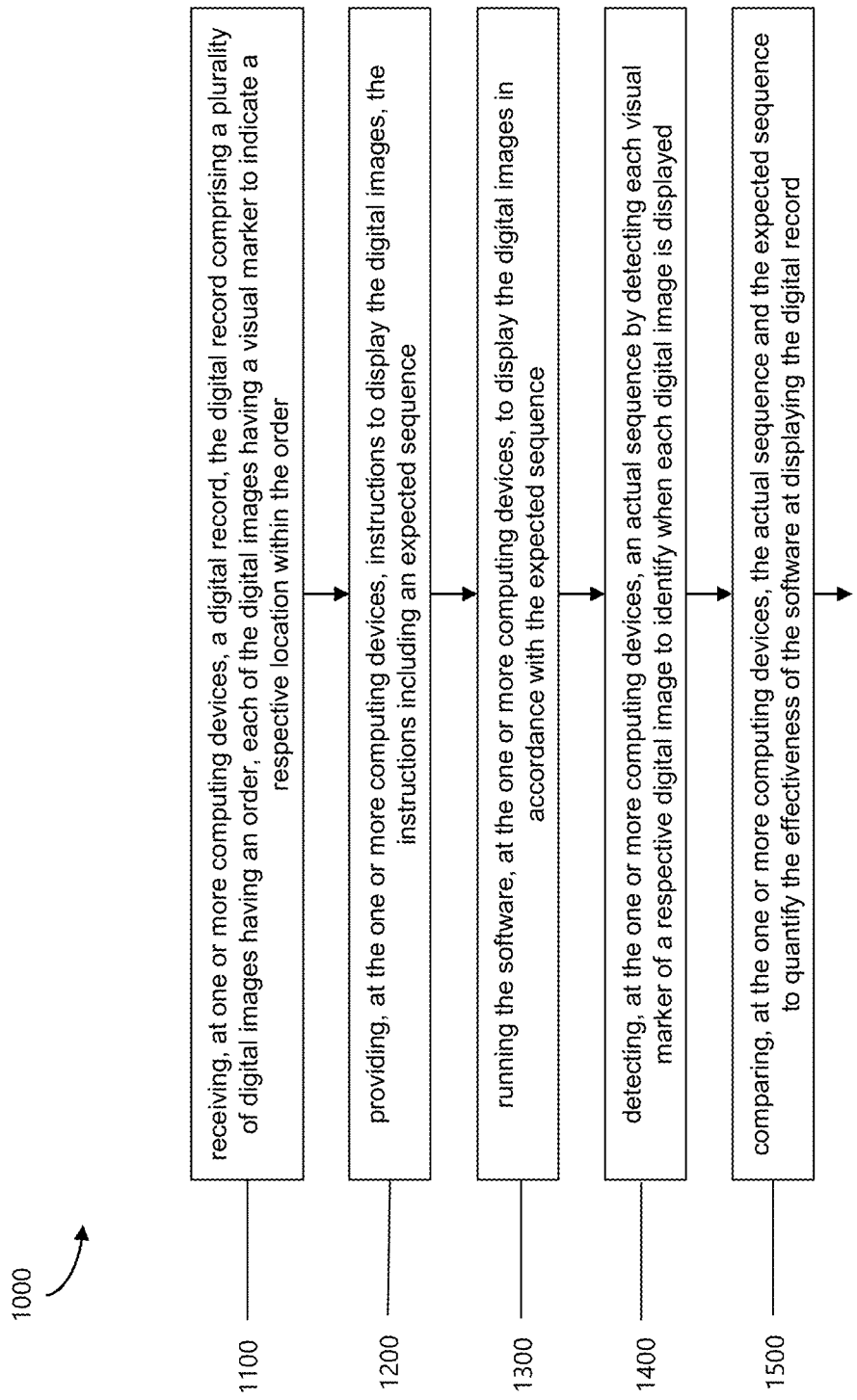
FIG. 10 is a flow chart of a method for testing software configured to display a plurality of digital images, in accordance with the disclosed subject matter.

FIG. 10 illustrates an example method 1000 for testing software configured to display a plurality of digital images. The method can begin at step 1100, where the method includes receiving, at one or more computing devices, a digital record, the digital record comprising a plurality of digital images having an order, each of the digital images having a visual marker to indicate a respective location within the order. At step 1200 the method can include providing, at the one or more computing devices, instructions to display the digital images, the instructions including an expected sequence. At step 1300 the method can include running the software, at the one or more computing devices, to display the digital images in accordance with the expected sequence. At step 1400 the method can include detecting, at the one or more computing devices, an actual sequence by detecting each visual marker of a respective digital image to identify when each digital image is displayed. At step 1500 the method can include comparing, at the one or more computing devices, the actual sequence and the expected sequence to quantify the effectiveness of the software at displaying the digital record. In accordance with the disclosed subject matter, the method can repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for testing software including the particular steps of the method of FIG. 10, this disclosure contemplates any suitable method for testing software including any suitable steps, which can include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

As described above in connection with certain embodiments, certain components, e.g., server 30, test machine 60, and capture machine (e.g., 60A, 80), can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in permitting the system and method for displaying medical image records. For example, the presence of the computers, processors, memory, storage, and networking hardware provides the ability to display medical image records in a more efficient manner. Moreover, testing the display of medical image records cannot be accomplished with pen or paper, as such information is received over a network in electronic form.

The subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or may be included in, one or more separate physical components or media (e.g., multiple CDs, disks, or other storage devices).

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program can include, by way of example and not by way of limitation, both general and special purpose microprocessors. Devices suitable for storing computer program instructions and data can include all forms of non-volatile memory, media and memory devices, including by way of example but not by way of limitation, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Additionally, as described above in connection with certain embodiments, certain components can communicate with certain other components, for example via a network, e.g., a local area network or the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A method of testing software configured to display a plurality of digital images, the method comprising:
receiving, at one or more computing devices, each computing device having a memory and a hardware processor, and the computing devices including a test machine and a capture machine, a digital record, the digital record comprising a plurality of digital images having an order, each of the digital images having a visual marker to indicate a respective location within the order, wherein the digital images comprise test images including human-readable metrics added to pixel data, and wherein the digital record comprises a sinusoidal pattern;
providing, at the one or more computing devices, instructions to display the digital images, the instructions including an expected sequence, wherein the expected sequence includes a variable rate of display of frames;
running the software, at the test machine, to display the digital images in accordance with the expected sequence;
displaying the digital images on a graphical user interface;
detecting, at the capture machine, an actual sequence by detecting each visual marker of a respective digital image to identify when each digital image is displayed;

comparing, at the one or more computing devices, the actual sequence and the expected sequence to identify aberrations between the actual sequence and the expected sequence; and quantifying, at the one or more computing devices, the effectiveness of the software at displaying the digital record by determining whether the aberrations are within an expected tolerance.

2. The method of claim 1, wherein the visual marker comprises a progress bar.

3. The method of claim 1, wherein the visual marker comprises a stamp added to each digital image.

4. The method of claim 3, wherein the visual marker comprises one of a quick response ("QR") code and a bar code.

5. The method of claim 1, wherein the expected sequence comprises a test-display duration for each digital image, respectively.

6. The method of claim 5, wherein the actual sequence comprises an actual-display duration for each digital image, respectively.

7. The method of claim 6, wherein comparing the actual sequence and the expected sequence comprises subtracting the test-display duration for each digital image from the actual-display duration for each image, respectively.

8. One or more computer readable non-transitory storage media embodying software that is operable when executed to:

receive, at one or more computing devices, each computing device having a memory and a hardware processor, the computing devices including a test machine and a capture machine, a digital record, the digital record comprising a plurality of digital images having an order, each of the digital images having a visual marker to indicate a respective location within the order, wherein the digital images comprise test images including human-readable metrics added to pixel data, and wherein the digital record comprises a sinusoidal pattern;

provide, at the one or more computing devices, instructions to display the digital images, the instructions including an expected sequence, wherein the expected sequence includes a variable rate of display of frames;

run software-to-be-tested, at the test machine, to display the digital images in accordance with the expected sequence;

display the digital images on a graphical user interface;

detect, at the capture machine, an actual sequence by detecting each visual marker of a respective digital image to identify when each digital image is displayed;

compare, at the one or more computing devices, the actual sequence and the expected sequence to identify aberrations between the actual sequence and the expected sequence; and quantify, at the one or more computing devices, the effectiveness of the software-to-be-tested at displaying the digital record by determining whether the aberrations are within an expected tolerance.

9. The media of claim 8, wherein the visual marker comprises a progress bar.

10. The media of claim 8, wherein the visual marker comprises a stamp added to each digital image.

11. The media of claim 10, wherein the visual marker comprises one of a quick response ("QR") code and a bar code.

12. The media of claim 8, wherein the expected sequence comprises a test-display duration for each digital image, respectively.

13. The media of claim 12, wherein the actual sequence comprises an actual-display duration for each digital image, respectively.

14. The media of claim 13, wherein comparing the actual sequence and the expected sequence comprises subtracting the test-display duration for each digital image from the actual-display duration for each image, respectively.

15. A system comprising: one or more hardware processors; and a memory coupled to the processors comprising instructions executable by the processors, the processors being operable when executing the instructions to:

receive, at one or more computing devices, each computing device having a memory and a hardware processor, the computing devices including a test machine and a capture machine, a digital record, the digital record comprising a plurality of digital images having an order, each of the digital images having a visual marker to indicate a respective location within the order, wherein the digital images comprise test images including human-readable metrics added to pixel data, and wherein the digital record comprises a sinusoidal pattern;

provide, at the one or more computing devices, instructions to display the digital images, the instructions including an expected sequence, wherein the expected sequence includes a variable rate of display of frames;

run software-to-be-tested, at the test machine, to display the digital images in accordance with the expected sequence;

display the digital images on a graphical user interface;

detect, at the capture machine, an actual sequence by detecting each visual marker of a respective digital image to identify when each digital image is displayed;

compare, at the one or more computing devices, the actual sequence and the expected sequence to identify aberrations between the actual sequence and the expected sequence; and quantify, at the one or more computing devices, the effectiveness of the software-to-be-tested at displaying the digital record by determining whether the aberrations are within an expected tolerance.

16. The system of claim 15, wherein the visual marker comprises a progress bar.

17. The system of claim 15, wherein the visual marker comprises a stamp added to each digital image.

18. The system of claim 17, wherein the visual marker comprises one of a quick response ("QR") code and a bar code.

19. The system of claim 15, wherein the expected sequence comprises a test-display duration for each digital image, respectively.

20. The system of claim 19, wherein the actual sequence comprises an actual-display duration for each digital image, respectively.

21. The system of claim 20, wherein comparing the actual sequence and the expected sequence comprises subtracting the test-display duration for each digital image from the actual-display duration for each image, respectively.

* * * * *

UNITED STATES PATENT AND TRADEMARK OFFICE
CERTIFICATE OF CORRECTION

PATENT NO. : 11,487,651 B2
APPLICATION NO. : 16/921319
DATED : November 1, 2022
INVENTOR(S) : Logan Frederick, Dmitry Kakhovsky and Duncan Henderson It is certified that error appears in the above-identified patent and that said Letters Patent is hereby corrected as shown below:

On the Title Page

Item (12) should read:
-- Frederick et al. --

At item (72) Inventors please add:
"Dmitry Kakhovsky, Miami, FL (US);
Duncan Henderson, Wilton, CT (US)"

Signed and Sealed this
Tenth Day of September, 2024

Katherine Kelly Vidal
*Director of the United States Patent and Trademark Office*